United States Patent
Baxter et al.

(10) Patent No.: US 12,194,660 B2
(45) Date of Patent: Jan. 14, 2025

(54) 3D CAPILLARY SELF-ASSEMBLY OF LONG ASPECT RATIO PARTICLES

(71) Applicant: Drexel University, Philadelphia, PA (US)

(72) Inventors: Joy Rene Baxter, Havertown, PA (US); Nicolas Javier Alvarez, Drexel Hill, PA (US); Giuseppe Raffaello Palmese, Hainesport, NJ (US)

(73) Assignee: Drexel University, Philadelphia, PA (US)

( * ) Notice: Subject to any disclaimer, the term of this patent is extended or adjusted under 35 U.S.C. 154(b) by 225 days.

(21) Appl. No.: 17/638,145

(22) PCT Filed: Aug. 28, 2020

(86) PCT No.: PCT/US2020/048322
§ 371 (c)(1),
(2) Date: Feb. 24, 2022

(87) PCT Pub. No.: WO2021/076239
PCT Pub. Date: Apr. 22, 2021

(65) Prior Publication Data
US 2022/0297350 A1 Sep. 22, 2022

Related U.S. Application Data

(60) Provisional application No. 62/893,979, filed on Aug. 30, 2019.

(51) Int. Cl.
B29B 7/90 (2006.01)
B29B 7/08 (2006.01)
(Continued)

(52) U.S. Cl.
CPC .................. *B29B 7/90* (2013.01); *B29B 7/08* (2013.01); *B29B 13/023* (2013.01); *B29C 70/12* (2013.01);
(Continued)

(58) Field of Classification Search
CPC B29B 7/90; B29B 7/08; B29B 13/023; B29C 70/12; B29K 2079/085;
(Continued)

(56) References Cited

U.S. PATENT DOCUMENTS 7,323,540 B2 * 1/2008 Velev .................. D01D 5/40
521/50
9,981,240 B1 * 5/2018 Roper .................. C01F 17/265
(Continued)

OTHER PUBLICATIONS

International Search Report and Written Opinion for corresponding International application No. PCT/US2020/048322; dated May 10, 2021 (10 pages).
(Continued)

*Primary Examiner* — Christopher M Rodd
*Assistant Examiner* — Shibin Liang
(74) *Attorney, Agent, or Firm* — Mendelsohn Dunleavy, PC

(57) ABSTRACT

The present invention relates to a method for assembling particles having a long axis, a short axis and an average aspect ratio of 10-10,000. The method includes agitating a combination of a first solution, a second solution and the particles in any order to form a mixture wherein one of the first solution and the second solution is in the form of droplets dispersed in the other of the first solution and the second solution and the long axis of the particles is longer than a diameter of the droplets in the mixture, and continuing the agitation until the particles assemble into aggregates of particles with at least 30% of the particles aligned in
(Continued)

parallel along the long axis. Aggregate or aggregate composites form by the method are also described.

20 Claims, 10 Drawing Sheets

(51) Int. Cl.
*B29B 13/02* (2006.01)
*B29C 70/12* (2006.01)
*B29K 79/00* (2006.01)
*B29K 105/00* (2006.01)
*B29K 105/12* (2006.01)
*B29K 307/04* (2006.01)

(52) U.S. Cl.
CPC *B29K 2079/085* (2013.01); *B29K 2105/0073* (2013.01); *B29K 2105/128* (2013.01); *B29K 2105/251* (2013.01); *B29K 2307/04* (2013.01); *B29K 2995/0092* (2013.01); *B29K 2995/0093* (2013.01)

(58) Field of Classification Search
CPC ...... B29K 2105/0073; B29K 2105/128; B29K 2105/251; B29K 2307/04; B29K 2995/0092; B29K 2995/0093
See application file for complete search history.

(56) References Cited

U.S. PATENT DOCUMENTS

| | | |
|---|---|---|
| 2014/0065234 A1 | 3/2014 | Shum et al. |
| 2015/0125498 A1* | 5/2015 | Dejmek ............... A61K 8/022 |
| | | 426/654 |
| 2015/0280241 A1 | 10/2015 | Hara et al. |
| 2016/0051958 A1 | 2/2016 | Kung et al. |
| 2016/0139090 A1 | 5/2016 | Schoonen et al. |
| 2017/0188618 A1* | 7/2017 | Ulijn .................. A23L 33/175 |

OTHER PUBLICATIONS

Gu, Zhiyong, et al. "Surface tension driven self-assembly of bundles and networks of 200 nm diameter rods using a polymerizable adhesive." Langmuir 20.26 (2004): 11308-11311.

Kalashnikova, Irina, et al. "Cellulosic nanorods of various aspect ratios for oil in water Pickering emulsions." Soft Matter 9.3 (2013): 952-959.

Knuesel, Robert J., et al. "Self-Assembly and Self-Tiling: Integrating Active Dies Across Length Scales on Flexible Substrates." Journal of Microelectromechanical Systems 21.1 (2012): 85-99.

Mastrangeli, Massimo, et al. "Self-assembly from milli-to nanoscales: methods and applications." Journal of Micromechanics and Microengineering 19.8 (2009): (72 pages).

Mastrangeli, Massimo, et al. "Surface tension-driven self-alignment." Soft Matter 13.2 (2017): 304-327.

Whitesides, George M., et al. "Self-Assembly at All Scales." Science 295.5564 (2002): 2418-2421.

* cited by examiner

Fig. 10A
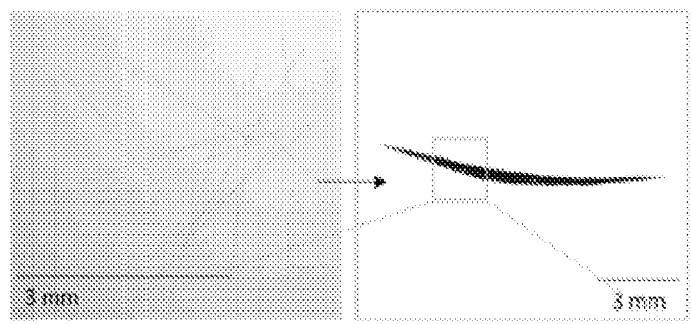
Fig. 10B
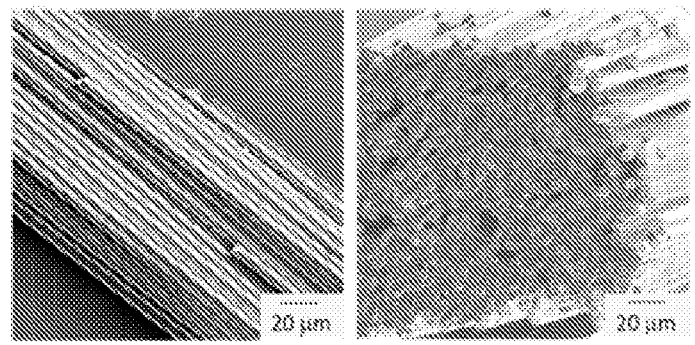
Fig. 10C

3D CAPILLARY SELF-ASSEMBLY OF LONG ASPECT RATIO PARTICLES

CROSS REFERENCE TO RELATED APPLICATIONS

This application claims the benefit of U.S. Provisional Application No. 62/893,979, filed on Aug. 30, 2019, the entire disclosure of which is hereby incorporated by reference as if set forth fully herein.

STATEMENT OF GOVERNMENT INTEREST

This invention was made with government support under contract no. HR0011-16-2-0014 awarded by Defense Advanced Research Projects Agency. The Government has certain rights in the invention.

BRIEF DESCRIPTION OF THE STATE OF THE ART

Self-assembly of components not easily manipulated by traditional processes and is of great advantage in manufacturing. Much work has been done in the field of self-assembly spanning the fields from biology to microelectronics (M. Mastrangeli et al., 2009; Massimo Mastrangeli, Zhou, Sariola, & Lambert, 2017; Whitesides & Grzybowski, 2002). One category of self-assembly is capillary self-alignment or surface-tension-driven self-alignment. In capillary self-alignment micro components are aligned by the reduction of surface tension for a droplet of fluid or at interfaces between fluids (Gu, Chen, & Gracias, 2004; Knuesel, Park, Zheng, & Jacobs, 2012; Massimo Mastrangeli et al., 2017). For example, square micro components of 200 μm×200 μm×50 μm self-align when placed onto drops of liquid on a flat surface (Massimo Mastrangeli et al., 2017). Similarly, 20-60 μm semiconductor components self-align on the interface of two immiscible liquids (Knuesel et al., 2012). In these examples capillary self-alignment is only utilized in a two-dimensional system and require patterning of the surface. No work to date has focused on stochastic self-alignment in three dimensions using capillary self-alignment without need for patterning.

Emulsions of two-immiscible fluids have been used to self-assemble colloidal spheres and colloidal elongated particles or rods (Kalashnikova, Bizot, Bertoncini, & Capron, 2013). These emulsions, some of which are "Pickering emulsions" contain particles that are between approximately 1 to 1000 nm (Levine, 2001) smaller than the diameter of the fluid droplets in the emulsion. No work to date has focused on self-assembly of largest aspect ratio particles in an emulsion in which the length scale of the particle is larger than the diameter of the droplet.

One application of aligned fibers is in carbon fiber reinforced polymers. Polymer composites incorporating carbon fibers as a lightweight strength component are a common material in which a fabric of carbon fibers is impregnated with polymer. Some benefits of using chopped carbon fibers (aspect ratios of 200 to 1200) in a composite instead of a fabric are increased curvature in a part, ease of handling in manufacturing, and recyclability. Chopped carbon fibers are currently used in polymer composites but are not aligned. Alignment of chopped carbon fibers in polymer composites will create a material with different properties that are now not available.

SUMMARY OF THE INVENTION

A method for self-assembly of high aspect ratio fibers or particles in solution is described herein. Fibers in suspension are self-assembled along their longest length through agitation and the addition of an immiscible second phase. The self-assembled aggregate can be grown by the addition of more fibers, and/or fiber suspension, and a second immiscible phase. Polymers and other materials can be added to the second immiscible phase to form a composite material. The self-assembled aggregate can be close packed and the distance between the fibers can be modulated by the quantities added to the second immiscible phase. The resultant self-assembled aggregate can remain in, or be removed from, the solution.

One example of an application of this invention is the creation of a carbon fiber and polymer composite. Here carbon fibers have been suspended in water and upon agitation and the addition of chloroform containing dissolved polymer form a self-assembled aggregate. These self-assembled aggregates were grown to a size at which they were easily manipulated. The aggregates were subsequently aligned and then pressed to form a macroscale sheet.

The following sentences describe some embodiments of the invention.

1. In a first aspect, the present invention relates to a method for assembling particles having a long axis, a short axis and an average aspect ratio of 10-10,000, whereby said method comprises steps of:

agitating a combination of a first solution, a second solution and the particles in any order to form a mixture wherein one of the first solution and the second solution is in the form of droplets dispersed in the other of the first solution and the second solution and the long axis of the particles is longer than a diameter of the droplets in the mixture, and continuing the agitation until the particles assemble into aggregates of particles with at least 30% of the particles aligned in parallel along the long axis.

2. The method of sentence 1, wherein the agitation may be stochastic.

3. The method of any one of the previous sentences, wherein the agitation may be effected by ultrasound, shaking or stirring, or the agitation is effected by mechanical shaking.

4. The method of any one of the previous sentences, wherein the droplet may be smaller in diameter than half the length of the long axis of the particle; or the droplet is smaller in diameter than $1/4^{th}$ the length of the long axis of the particle; or the droplet is smaller in diameter than $1/8^{th}$ the length of the long axis of the particle; or the droplet is smaller in diameter than $1/25^{th}$ the length of the long axis of the particle; or the diameter of the droplet is $1/25$th to $1/200,000$th of the length of the long axis of the particle.

5. The method of any one of the previous sentences, wherein the droplet may be smaller in diameter than half the length of the short axis of the particle; or the droplet may be smaller in diameter than $1/4^{th}$ the length of the short axis of the particle; or the droplet may be smaller in diameter than $1/8^{th}$ the length of the short axis of the particle; or the droplet may be smaller in diameter than $1/25^{th}$ the length of the short axis of the particle; or the diameter of the droplet may be $1/25$th to $1/20,000$th of the length of the short axis of the particle.

6. The method of any one of the previous sentences, wherein the first solution may comprise 0.001 vol. % to 99.99 vol. % of the total liquid in the mixture; or wherein one of the first solution or the second solution may comprise 0.001 to 5 vol. % of the total liquid in the mixture.

7. The method of any one of the previous sentences, wherein the first solution may be insoluble in the second solution.

8. The method of any one of the previous sentences, wherein one of the first and the second solutions may be hydrophobic and another of the first and the second solutions may be hydrophilic.

9. The method of any one of the previous sentences, wherein both the droplets and a surface of the particles may be hydrophilic.

10. The method of any one of the previous sentences, wherein both the droplets and a surface of the particles may be hydrophobic.

11. The method of any one of the previous sentences, wherein the second solution may comprise a mixture of soluble species comprising polymer resins, which may or may not be soluble in the first solution.

12. The method of any one of the previous sentences, wherein the second solution may comprise chloroform and the first solution may comprise water; or wherein the second solution may comprise safflower oil and the first solution may comprise water.

13. The method of any one of the previous sentences, wherein the droplet may not be a fluid; or wherein the droplet may be a surfactant.

14. In a second aspect, the present invention relates to a method for assembling particles having a long axis, a short axis and an average aspect ratio of 10-10,000, said method comprising steps of:

combining a first solution, a second solution and the particles in any order to form a layered mixture wherein at least 90 vol. % of one of the first solution and the second solution is in a separate phase in the mixture and is positioned in a top layer above at least 90 vol. % of the other solution which is positioned in layer below said top layer, aligning the particles at the interface between the phases into aggregates of particles with at least 30% of the particles aligned in parallel along the long axis.

15. The method of sentence 14, wherein at least 95 vol. % of one of the first solution and the second solution may be in the separate phase and may be positioned in the top layer above at least 95 vol. % of the other solution positioned in the layer below the top layer; or wherein at least 99 vol. % of one of the first solution and the second solution may be in the separate phase and may be positioned in the top layer above at least 99 vol. % of the other solution positioned in the layer below the top layer.

16. The method of any one of sentences 14 and 15, wherein the second solution may be hydrophobic, and the first solution may be hydrophilic.

17. The method of any one of sentences 14-16, wherein the first solution may comprise water and the second solution may comprise at least one component selected from the group consisting of chloroform and safflower oil.

18. The method of any one of sentences 14-17, wherein the first solution and the second solution may be in motion relative to one another; or wherein the first solution and the second solution may not be in motion relative to one another.

19. The method of any one of the previous sentences, wherein the particles may be selected from the group consisting of fibers, polymers, proteins, mixed metal oxides and combinations thereof, or carbon fibers, glass fibers, mixed metal fibers, drawn polymer fibers, metal fibers, peptides, cellulose, and natural fibers and combinations thereof.

20. The method of any one of the previous sentences, wherein a temperature and overall composition may be selected such that the first solution and the second solution are immiscible during assembly of the particles into aggregates.

21. The method of any one of the previous sentences, wherein the first solution may comprise at least two different solvents.

22. The method of any one of the previous sentences, wherein the second solution may comprise at least two different solvents.

23. The method of any one of the previous sentences, wherein the first and second solution may each comprise at least two different solvents.

24. The method of any one of the previous sentences, wherein the particles may have a chemically modified surface, or wherein the particles may have been silanized, oxidized, modified with chemicals bonded to the surface, and combinations thereof.

25. The method of any one of the previous sentences, wherein the particles may have a silanized surface.

26. The method of any one of the previous sentences, optionally further comprising a step of reacting functional groups on a surface of the aggregates to bond aligned particles to one another.

27. The method of any one of the previous sentences, wherein the average aspect ratio of the particles may be 100-1200.

28. The method of any one of the previous sentences, wherein the average length of the particles may be 1 micron to 10 mm, or the average length of the particles may be 1.5 to 6 mm.

29. The method of any one of the previous sentences, wherein the particle is semi rigid to rigid such that the tensile modulus may be between 0.1 GPa to 10,000 GPa and the thickness may be between 1 nanometer to 1 mm; or the tensile modulus may be from 1 GPa to 5,000 GPa and the thickness may be from 50 nanometers to 0.1 mm; or the tensile modulus may be from 10 GPa to 1,000 GPa and the thickness may be from 100 nanometers to 0.01 mm.

30. The method of any one of the previous sentences, wherein the amount of the particles in the mixture may be more than one particle up to at or near the percolation concentration of the mixture; or the amount of particles in the mixture may be 0.005 to 0.8 g particles per liter of the mixture.

31. The method of any one of the previous sentences, wherein the concentration of the particles in the mixture may be near or below the percolation threshold of the mixture; or the concentration of the particles in the mixture may be at or below the concentration where there is overlap of the particles.

32. The method of any one of the previous sentences, wherein either the first or second solution may contain a thermoplastic or thermoset polymer resin; or either the first or second solution may contain a polyetherimide, polystyrene, polyamide, polyimide, polyolefin, polysulfone, polyvinyl, polyacrylate, polyacrylonitrile, cellulosic, polyfluoride (fluoroplastic), polycarbonate, polyester, polyphenylene oxide, polyketone, epoxy, furan, alkyl, phenolic, polyurethane, silicone, amino plastic, alkyd, allylic, or any combination.

33. The method of any one of the previous sentences, wherein the particles may align with polymer resin located between the particles.

34. The method of any one of the previous sentences, wherein the method may be a continuous process.

35. The method of any one of the previous sentences, wherein the method may be a batch process.

36. In a third aspect, the present invention relates to an aggregate or aggregate composite comprising the aggregate formed in the method according to any of the preceding sentences, wherein at least 30% of the particles are aligned in parallel along the long axis.

37. The aggregate or aggregate composite according to sentence 36, wherein greater than 95% of the particles may be aligned in parallel along the long axis, and the aggregate may comprise 1 to 95 vol. % particles and 99 to 5 vol. % polymer resin; or the aggregate may comprise 55 to 65 vol. % particles and 35 to 45 vol. % polymer resin or the aggregate may comprise about 60 vol. % particles and about 40 vol. % polymer resin.

38. The aggregate or aggregate composite according to any one of sentences 36-37, wherein the aggregate may have at least 40% of the particles aligned in parallel along the long axis; or at least 50% of the particles aligned in parallel along the long axis; or 30% to 99% of the particles aligned in parallel along the long axis.

39. The aggregate or aggregate composite according to any one of sentences 36-38, wherein the average aspect ratio of the aggregate may increase with the average aspect ratio of the particles; or wherein the average aspect ratio of the aggregate may essentially increase logarithmically with the average aspect ratio of the particles; or wherein the average aspect ratio of the aggregate may be between 10 and 400 and the average aspect ratio of the particles is 100-1100.

40. In a fourth aspect, the present invention relates to a method for forming a composite sheet comprising the steps of the methods according to any of the preceding method sentences and further comprising a step of: heating the aggregates: a) at temperature greater than the softening temperature of the polymer resin and b) under a pressure sufficient to compress the aggregates into a sheet.

41. The method according to sentence 40, wherein the polymer resin is a polyethylimide, the particle may be carbon fiber and the aggregates may be heated a) at temperature greater than 110° C., or 110 to 350° C.; and b) under at least 1 atm. pressure, or 1000 to 2000 atm. pressure.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

FIG. 3A shows chloroform added to fiber and water system as a second phase results in fiber aggregation.

FIG. 3B shows that chloroform dissolved in water first then added to dispersed fibers in water as a single water phase does not result in fiber aggregation. Scale bars equal 10 mm.

FIG. 7A shows 0.4 vol % (1 wt. %) of PEI in chloroform.

FIG. 7B shows 1.0 vol % (1 wt. %) PEI in chloroform.

FIG. 10A shows that the SAC method is a three-step process for self-assembly of fibers using two immiscible fluids, water (A) and chloroform (B).

FIG. 10B shows on the left, carbon fibers dispersed in fluid A (water), and on the right, an aligned short-fiber aggregate or "needle" formed by adding fluid B (chloroform) at 1 vol % to fluid A and shaking vigorously.

FIG. 10C shows on the left, an axial view of a needle comprised of overlapping highly-aligned fibers, and on the right, a cross-section of a needle with highly-aligned fibers held together with a small amount of adhesive for imaging.

FIG. 11A shows the mass loss as a function of temperature measured via TGA.

FIG. 11B shows the corresponding mass of PEI in the dry needle as a function of wt % PEI in fluid B.

FIG. 11C shows in the top two images, cross-sections of needles with the lowest (left) and highest (right) polymer loading before consolidation, note the presence of voids. The bottom two images show the same needle cross section after consolidation and the elimination of voids.

DETAILED DESCRIPTION

Examples

Materials and Methods

Figure 1:
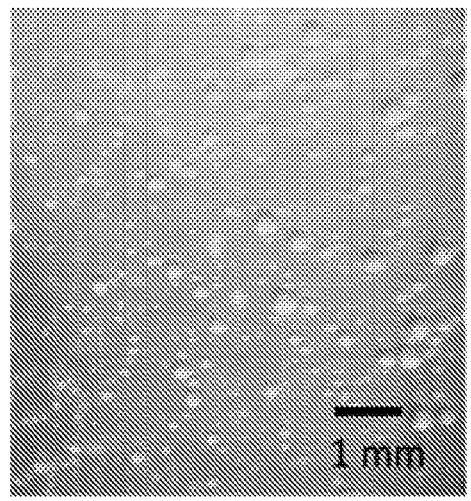
FIG. 1 shows safflower oil droplets in water, agitated by vigorous shaking by hand.

Long aspect ratio carbon fibers from various sources were used in these experiments (Table 1). The carbon fibers from Mitsubishi were received sized with a polymer coating. This coating was removed by placing the fibers in a Barnstead Thermodyne 48000 furnace at 650° C. for 1.5 hours. No additional treatment was performed. Both the Mistubishi fibers and the IM7 fibers were cut in half by hand using a razor blade. The resulting fiber length was 1.5 mm and 2.5 mm on average for Mitsubishi and IM7 fibers, respectively.

Carbon fibers were dispersed in MilliQ water (resistivity of 18.2 MOhms·cm), as the first phase unless noted. Fibers were dispersed into the water phase by shaking, rotational mixing, physical manipulation, or with an ultrasound horn. Before each experiment the fibers were redispersed by shaking. MilliQ water saturated with chloroform was prepared by extracting the supernatant of MilliQ water mixed with excess chloroform. Chloroform, BDH VWR Stabilized ACS, and safflower oil, Natural Value, were used as second phases. Polyether imide (PEI), Ultem 1000F3SP-1000 lot #, SABIC; Riyadh, Saudi Arabia and lot UL4YMB, was dissolved in chloroform at 0.1-5 wt %.

Mechanical stirring, utilizing a stir bar of size, 15.9 mm×8 mm in 20 mL scintillation vials at 1150 rpm, was mainly used for agitation of the carbon fibers in solution. The carbon fibers in the first phase solution, water, were stirred while the $2^{nd}$ phase droplets were added by syringe. To determine the droplet size of chloroform added to the system and after agitation, a first phase of MilliQ water saturated with chloroform at room temperature was used thereby reducing the driving force of chloroform solubilizing in water. Images of the droplets were taken about 20 seconds after addition and agitation and appeared to be stable in size during this time without significant coalescence. The chloroform was added by fast injection with a syringe producing multiple droplets and stirred.

In addition to mechanical stirring, vigorous shaking by hand of scintillation vials or 100 mL media bottles was performed as a way to agitate the system. The chloroform was either added to the water phase by bolus syringe drop and shaken or added by fast injection with a syringe.

Fluorescence microscopy was utilized to image PEI between the fibers. A Zeiss Axioskop 2 plus was used. The samples were excited at a wavelength of ≥365±5 nm and detected at ≥395 nm. All images were collected as black and white images where the PEI appears white and the carbon fiber and background appear dark.

The nuggets were cross-sectioned across and along the axis of the fibers using a razor blade. Prior to cutting the nuggets they were dried in an 100° C. oven for over two hours. The nuggets cross-sectioned across the axis of the fibers were imaged with fluorescence microscopy while supported in the upright position by plastic pipette tips epoxied to a glass slide.

Optical microscopy together with direct physical measurement was utilized to measure the aspect ratio of the aligned carbon fiber aggregates.

TABLE 1

| Carbon Fiber name | Source | Length (mm) | Diameter (μm) | Aspect ratio (L/D) | Density* (g/cm³) | Treatment after purchase |
|---|---|---|---|---|---|---|
| Mitsubishi | Dialead Pitch Carbon Fiber Type K63B12, Lot# 05196-1 | 3 | 10 | 150 | 2.16 | Sizing removed by burning at 650° C. for 1.5 hrs |
| Mitsubishi | Dialead Pitch Carbon Fiber Type K63B12, Lot# 05196-1 | 1.5 | 10 | 300 | 2.16 | 1) Sizing removed by burning at 650° C. for 1.5 hrs 2) Cut in half |
| IM7 | PAN, Hexcel; Stamford, CT Lot#04177 | 5 | 5 | 1000 | 1.78 | |
| IM7 | PAN, Hexcel; Stamford, CT Lot#04177 | 2.5 | 5 | 500 | 1.78 | Cut in half |
| Asbury | Pitch AGM-95 CF0250 Asbury Carbons, Asbury NJ | 6 | 10 | 600 | 1.2-1.9 | Sizing removed by UD |

*Prior to processing

Thermal gravimetric analysis (TGA), Q50 TA Instruments, New Castle DE, was performed on carbon fiber composite samples containing PEI. The 4-13 mg samples were heated to 800° C. at 10° C./min in an Argon environment. The Argon flow rates were 60 mL/min purge and 40 mL/min sample. At lower flow rates of Argon degradation of carbon was observed above 550° C. PEI has an ash residue at 800° C. The amount of PEI in the samples was calculated by dividing the percentage weight loss in the sample at 800° C. by the percentage weight loss of neat PEI compared to uncoated fibers, 49%.

A heated laboratory press, Carver Laboratory Heated Press model #3925, Carver Inc. Wabash, IN, at 240° C. for ~1 min at 20000 lbs was used to consolidate the carbon fiber/PEI composites both within an individual nugget and to make a join many nuggets into a bigger piece.

Results and Discussion

Figure 2A:
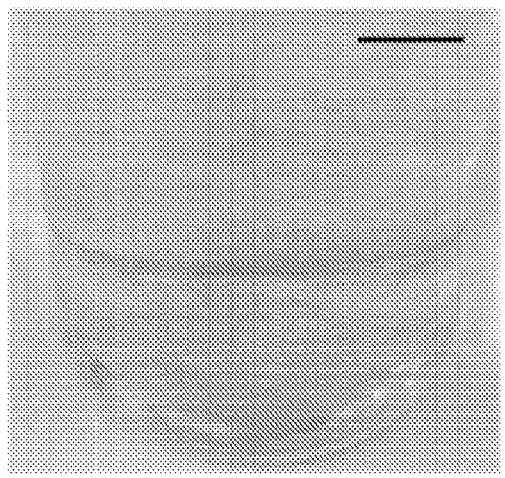
FIG. 2A shows the self-assembly of IM7 fibers dispersed in MilliQ water with a 0.0017 vol % fibers/soln.
Figure 2B:
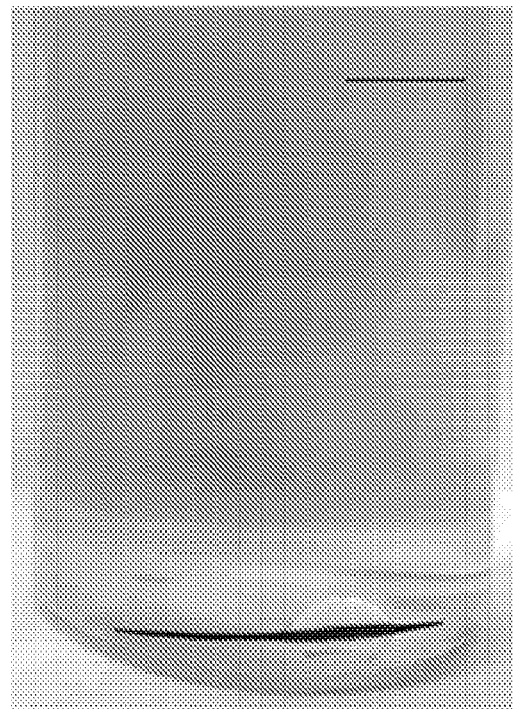
FIG. 2B shows the self-assembly of IM7 fibers aggregated after addition of chloroform at 1 vol % and agitation by vigorous shaking.
Figure 2C:
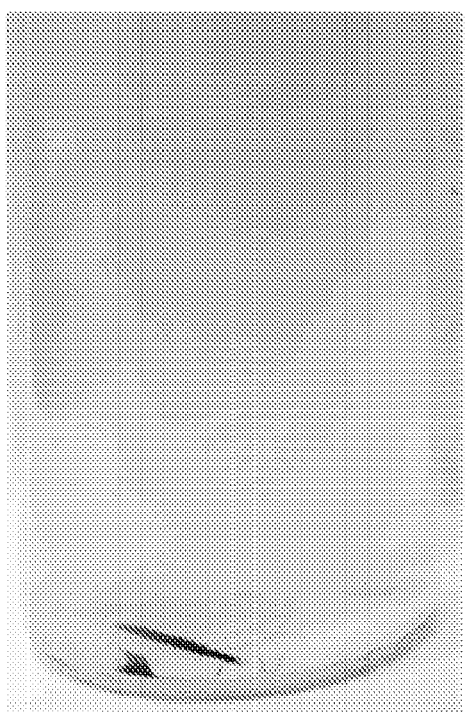
FIG. 2C shows the self-assembly of IM7 fibers aggregated after addition of safflower oil at 1 vol % and agitation by vigorous shaking. Scale bars equal 10 mm.

Self-assembly of carbon fibers was achieved by agitating an immiscible phase to carbon fibers already suspended in solution. IM7 fibers, 0.03 g fibers/L of MilliQ water (0.0017 vol %), were first suspended in water (FIG. 2A). Upon the addition of 200 μL of chloroform to 20 mL (1 vol %) of IM7 fiber suspension in a scintillation vial and vigorous shaking a self-assembled nugget is formed (FIG. 2B). A droplet of excess chloroform can be seen around the nugget. If the same experimental process is performed with safflower oil again a nugget is formed. Excess safflower seed oil is at the top of the solution.

Two liquid phases along with agitation are required to form the self-assembled nuggets. Chloroform is slightly soluble in water ($7.95*10^3$ mg/L at 25° C. (Mackay D et al; Chemosphere 9: 701-11 (1980))). The chloroform solubilizes over time. We investigated two cases in which the fibers were agitated in water with the same amount of chloroform present: (FIG. 3A) Prior to solubilization of chloroform into the water and (FIG. 3B) After solubilization of chloloform in water. The amount of chloroform in the system is 0.05 vol % well below the solubility limit of 0.53 vol % (at 25° C.) chloroform in water. When the chloroform is added as a second phase, several nuggets are formed when agitated by a stir bar. However, when the chloroform has already been solubilized and therefore only one liquid phase is present in the system no self-assembly occurs with a dispersion of fibers remaining in solution. This suggests that although chloroform is slightly soluble in water aggregation of the fibers occurs during time when chloroform is a separate second phase, prior to full solubilization.

Figure 3A:
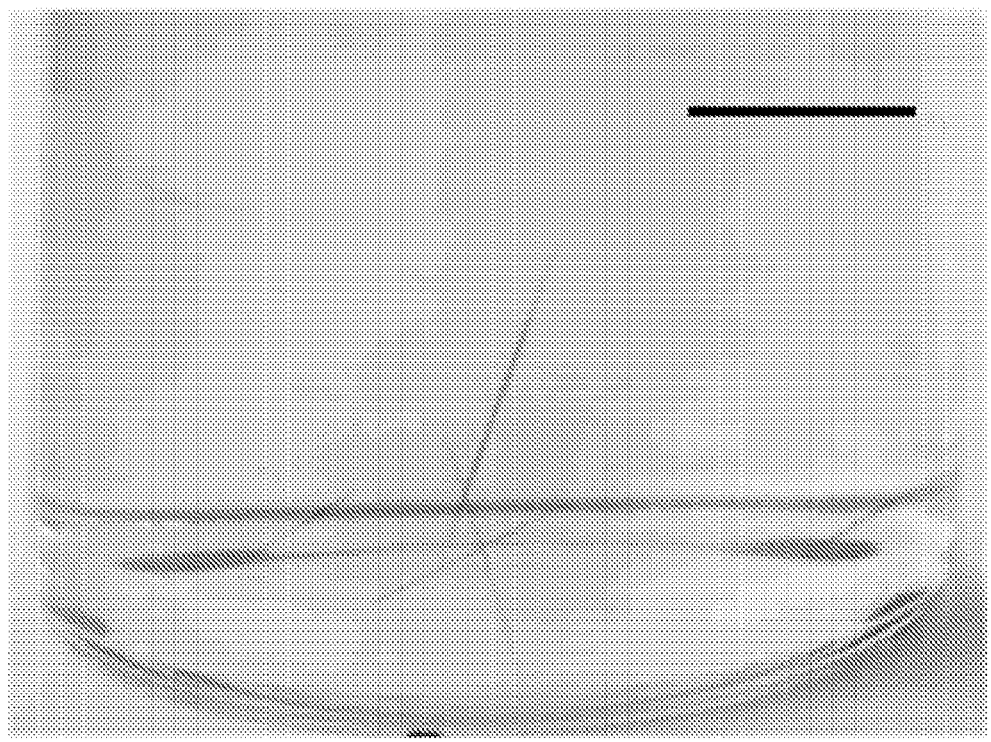
FIGS. 3A-3B show that two liquid phases are necessary for self-assembly (0.05 vol % chloroform in MilliQ water, and 0.005 g/L IM7 fibers ($2.8e^{-4}$ vol % fibers in solution) agitated with stir bar).
Figure 3B:
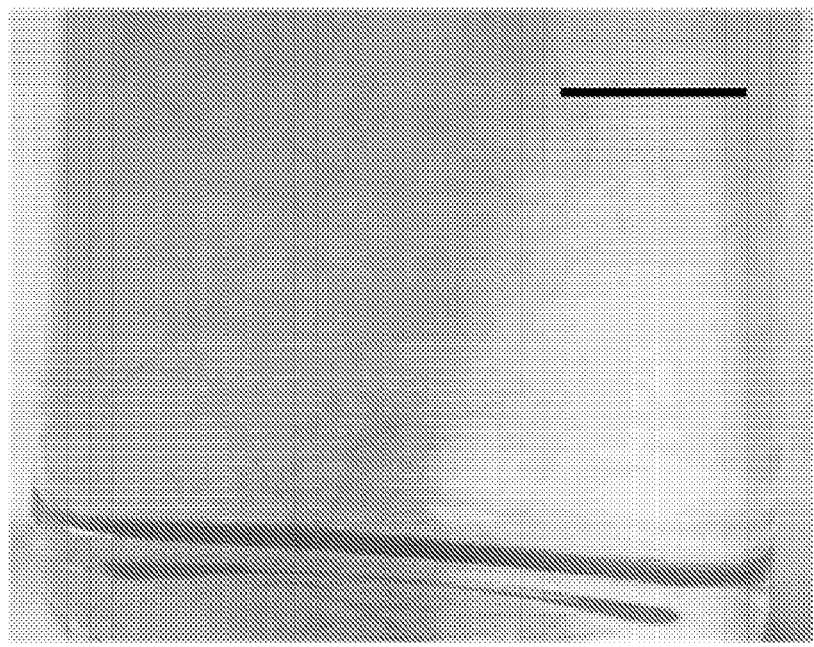
Figure 4:
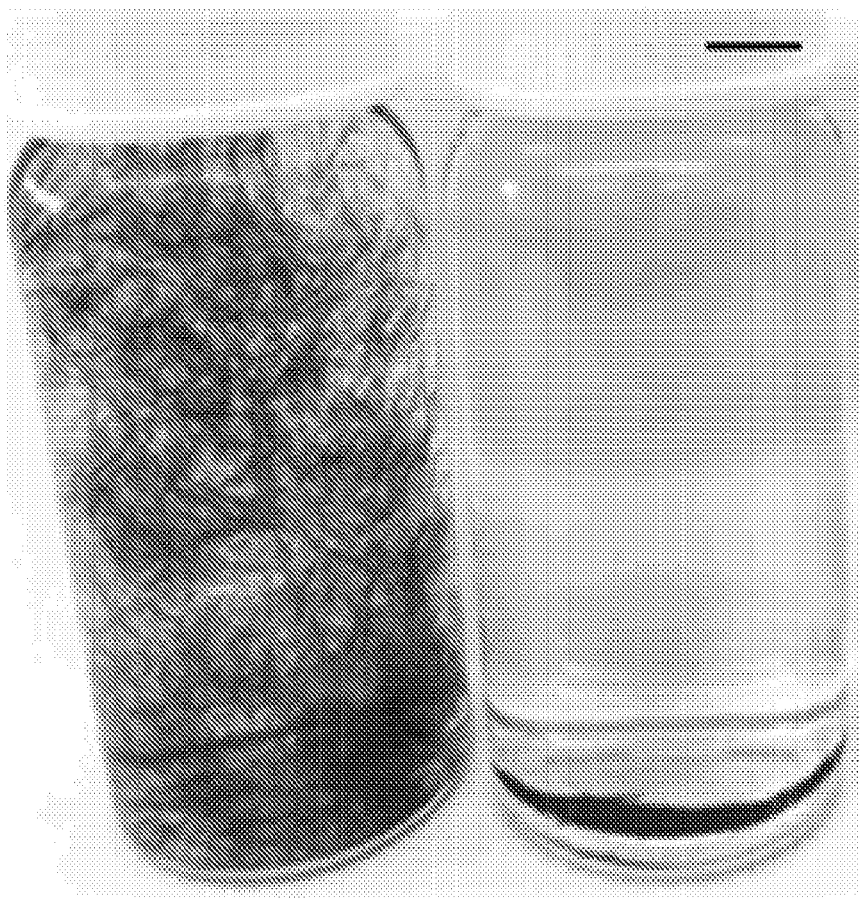
FIG. 4 shows that self-assembly is not limited to very low concentrations of fiber but can be achieved with 0.04 vol % fibers in solution (0.3 vol % chloroform in MilliQ water, 0.8 g/L Mitsubishi fibers, agitated with stir bar). The left side of the figure shows fiber density prior to self-assembly. The right side of the figure shows self-assembled nugget. Scale bar equal 10 mm.

There are many variables that are important to this method of self-assembly including the dispersibility of the fiber, choice of immiscible liquid phases, concentration of the second liquid phase, density of fibers, method of agitation, presense of a binder such as disolved polymer in the second liquid phase, and surface chemistry of the fiber or particle. Self-assembly of long aspect ratio fibers is not limited to very low concentrations of fibers but can be achieved at 0.04 vol % of fibers (FIG. 4). The Mitsubishi fibers in FIG. 4 can be dispersed in water in a much higher concentrations than the IM7 fibers in FIGS. 2A-2C and 3A-3B. The immiscible phases explored here are the first phase as MilliQ water and second phase as chloroform, safflower seed oil, or chloroform with polyetherimide. Inversion of the phases with safflower seed oil as the first phase and water as the second phase did not result in self-assembly when agitated by mixing.

Figure 5:
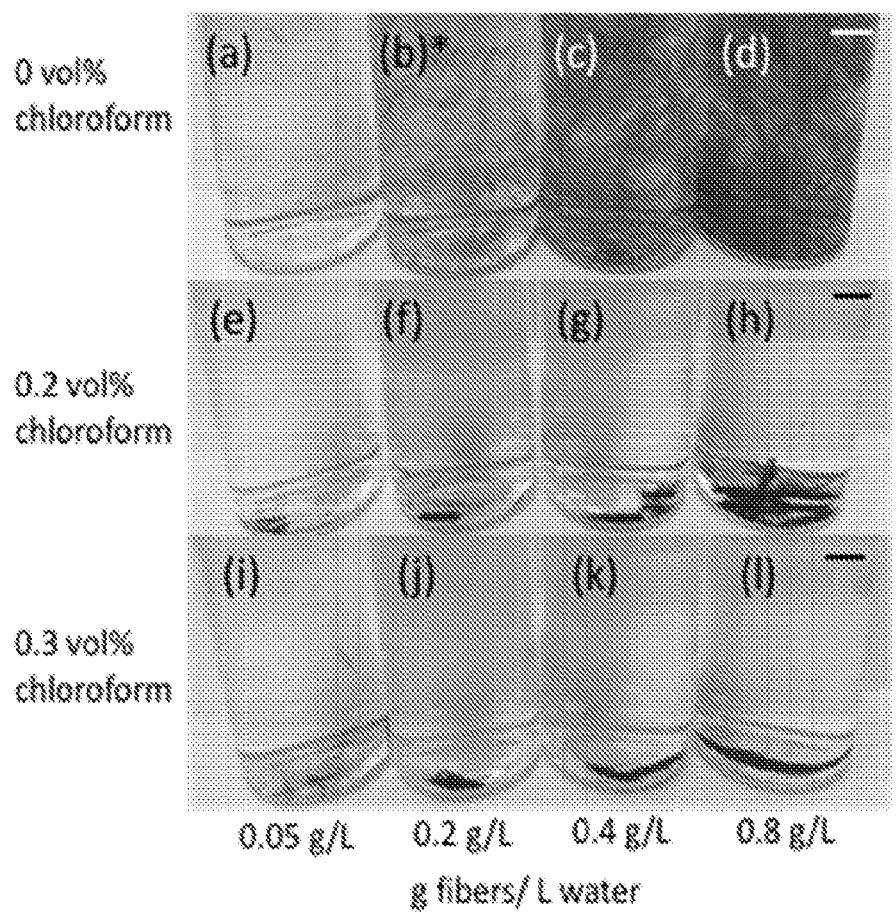
FIG. 5 shows that the concentration of the second liquid phase and fiber concentration are important variables in the self-assembly process and are interrelated. Mitsubishi fibers were agitated by stirring at four different concentrations of second liquid phase, chloroform, and fiber in water of 0.05, 0.2, 0.4, and 0.8 g/L. (*0.1 g fibers/L water). Scale bars equal 10 mm.

The variables of the concentration of the second liquid phase and the concentration of the fibers in solution appear to be related. This may have to do with the frequency of contact between the fiber and a droplet in solution. When there are more fibers in solution with a set number of second phase droplets there is a high probability of contact between the fiber and droplet and other fibers and droplets (FIG. 5, middle and bottom row). At the lowest fiber concentration of 0.05 g fibers/L water, FIG. 5, image (e) and (i), weak aggregation of the fibers is observed with a part of a nugget forming in image (e) and no identifiable nugget formed in image (i). Without increasing the amount of chloroform in the system more aggregation is observed when the fiber concentration is increased to 0.2 g/L. At higher fiber concentrations of 0.4 and 0.8 g/L increasing the concentration of chloroform from 0.2 vol % to 0.3 vol % results in an increase in aggregation observed by the presence of a single nugget in FIG. 5, images (k) and (l).

Figure 6:
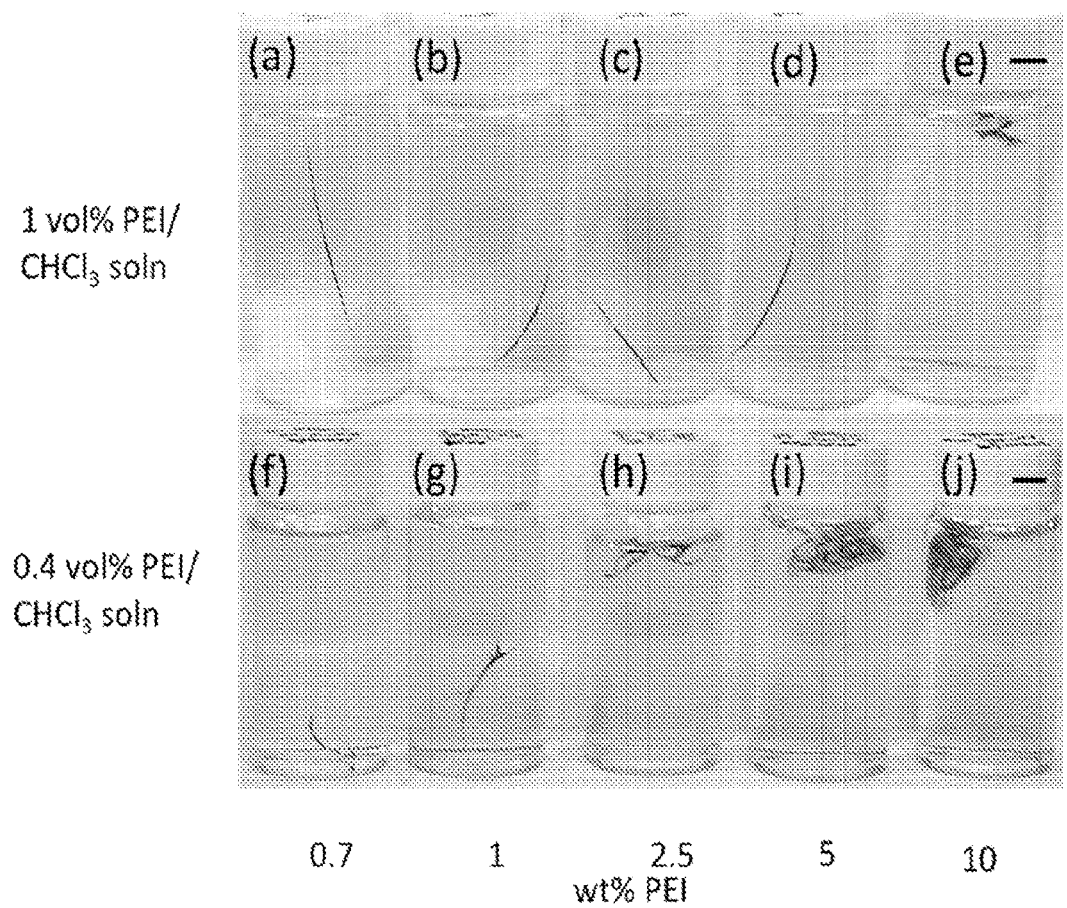
FIG. 6 shows that self-assembly of the fibers into a composite nugget is partially dependent on the amount of polyethylimide (PEI) in the second liquid phase. The top rows (a)-(e) show that at 1 vol % of the second liquid phase, the morphology is independent of the polymer concentration of between 0.7 to 5 wt. % of PEI in chloroform. However, at 10 wt. % PEI, no nugget is formed. The bottom rows, (f)-(j) show that at a lower concentration of second liquid phase, 0.4 vol %, within the solubility limit of chloroform in water, the morphology is highly dependent on the polymer concentration. No nuggets without bifurcations are formed under these conditions. ($1.7 \times 10^{-3}$ vol % IM7 fibers, agitated by vigorous shaking). Scale bars equal 10 mm.

The method of agitation of the system is important. Both vigorous shaking by hand (FIGS. 2A and 2B) and mixing with a stir bar (FIG. 3A, FIG. 4 (right image), and FIG. 5 (images (j), (k), and (l)) produce droplets of the second liquid phase and nuggets. The droplets produced by vigorous shaking are smaller than those produced by mixing with a stir bar suggesting that there may also be a larger quantity of droplets as well. Upon mechanical stirring the largest droplet sizes were about 350 μm in diameter for chloroform and chloroform with 2.5 wt % PEI. The droplet sizes of chloroform produced in this way were smaller than that produced by mechanical stirring at less than 250 μm for both chloroform and chloroform with 2.5 wt % PEI. Droplets of safflower oil when shaken in water were predominantly 50 μm in diameter. In all cases the length of the carbon fibers was more than 4 times larger than the largest droplet diameters around the time of agitation. Agitation by stirring generally results in nuggets that are less elongated with more fibers not incorporated into the nugget (FIG. 6). There is greater reproducibility of nugget morphologies when stirred than with vigorous shaking.

A self-assembled aligned polymer composite is formed using the two-phase liquid self-assembly method described by simply incorporating a dissolved polymer in the second liquid phase (FIG. 6). Polyether imide (PEI) in chloroform in concentrations of 0.7 to 5 wt % has been used as the second phase with both Mitsubishi and IM7 carbon fibers. The polymer acts as a binder or adhesive between the fibers which allows the self-assembled nuggets to be removed from solution and manipulated. It is intractable to remove the self-assembled fibers out of the solution when formed simply with two liquid phases with no binder. The conditions under which nuggets are formed when the polymer is present is partially dependent on the amount of PEI in the second liquid phase (FIG. 6). For IM7 fibers at 1 vol % of the second liquid phase the morphology is independent of the polymer concentration between 0.7 to 5 wt % of PEI in Chloroform at a fiber concentration of $1.7 \times 10^3$ vol % (FIG. 6, images (a)-(d)). However, at 10 wt % PEI no nugget is formed (FIG. 6, image (e)). At 1 vol % of chloroform containing PEI, the volume percent is almost twice that of the solubility limit of chloroform in water. A droplet of excess chloroform solution is observed in FIG. 6, image (c). At a lower concentration of second phase 0.4 vol %, within the solubility limit of chloroform in water, the morphology is highly dependent on the polymer concentration. No nuggets without bifurcations are formed under these conditions. At the same volume percent of fibers For Mitsubishi fibers at $5.1 \times 10^{-3}$ vol % nuggets are consistently formed at a second phase concentration of 0.4 to 0.5 vol % from 0.7-2.5 wt % PEI in chloroform. Interestingly, increasing the volume percent of the second phase to 1 vol % results in less alignment. Differences in the variables to form the nuggets for the two types of fibers may be due to the differences in fiber concentration, length of the fibers, or surface chemistry of the fibers themselves.

Self-assembled aggregation of the vast majority of the fibers in a batch of solution into a single nugget occurs under certain conditions. Aggregation of some but not all of the fibers in the batch solution also can occur and are referred to as mini-nuggets. Due to the stochastic nature of the self-assembly process there are experimental conditions in which a single nugget may be observed in one batch and mini-nuggets may be formed. Stirring carbon fibers and chloroform in water increases the probability of contact between the fibers and chloroform since they both are denser than water and are at a higher probability of being in the bottom of the vessel.

Figure 7A:
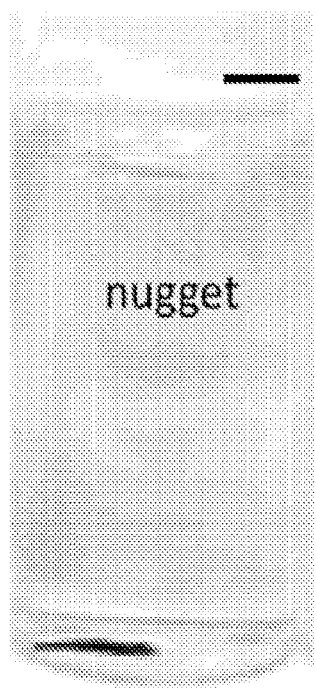
FIGS. 7A-7B show nugget formation at lower volume percent of the second phase for Mitsubishi carbon fibers at $5.1 \times 10^{-3}$. Scale bars equal 10 mm.
Figure 7B:
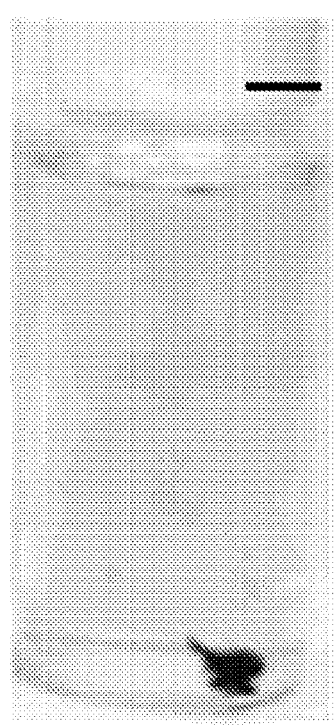
Figure 8:
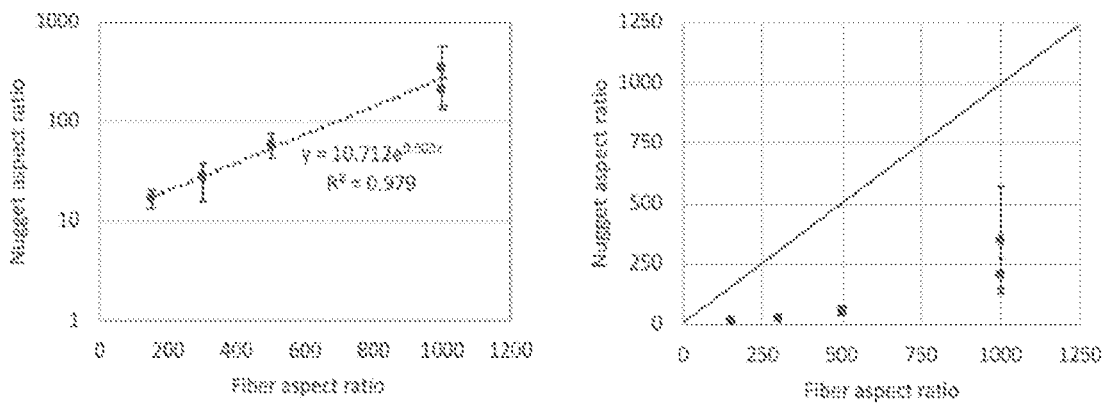
FIG. 8 shows the aspect ratio of the self-assembled nugget is dependent on the aspect ratio of the unit fibers where higher aspect ratio fibers result in higher aspect ratio nuggets. Other factors for affecting the aspect ratio of the nugget include the number of fibers and the concentration of the resin in the second phase.

The aspect ratio of the nugget formed with PEI as a binding agent is dependent on the aspect ratio of the base fiber (FIG. 8). The nuggets in FIG. 6, images (a)-(d) formed with IM7 fibers are much longer than the nugget formed in FIG. 7A.

Figure 9:
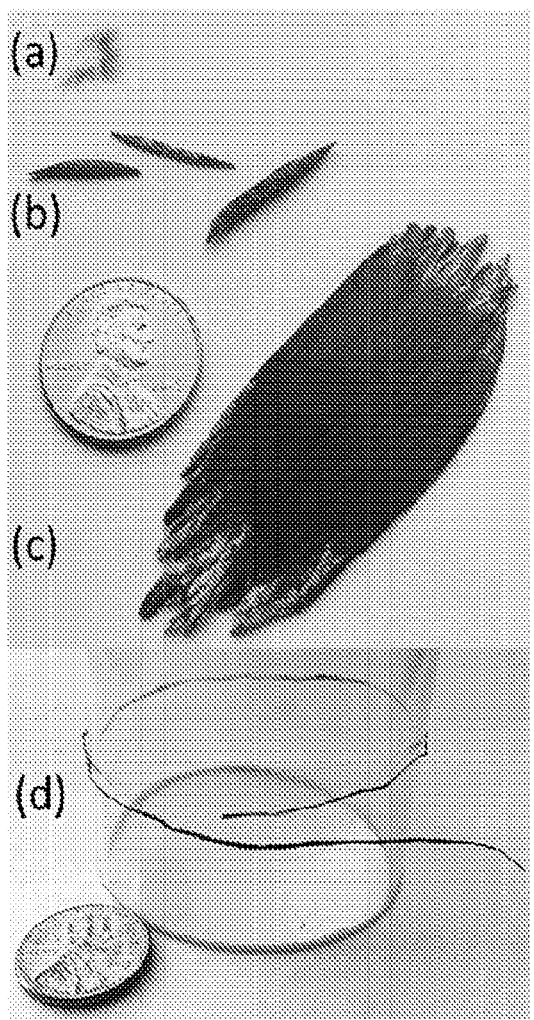
FIG. 9 shows polymer-carbon fiber composite (Polymer: PEI), where a) shows loose carbon fibers (Mitsubishi), b) includes nuggets, i.e. self-assembled and aligned short-fiber composites or "needles", c) shows a consolidated composite sheet made from 30+ needles arranged side-by-side, which is a pressed composite of nuggets, d) shows an aligned composite strand comprised of consolidated multiple large aspect ratio needles end-to-end, and the penny is present for perspective.

A sheet of polymer-carbon fiber composite was produced by manually assembling the self-assembled composite nuggets (FIG. 9). The nuggets were produced by vigorous shaking 100 mL of carbon fiber suspension, 0.1 g Mitsubishi fibers per L of MilliQ water, in a 100 mL media bottle after the addition of 500 µL of 2.5 wt % PEI in chloroform. Small nuggets were formed from this process. In addition, there were some fibers not incorporated into the nugget(s). These were fibers that got stuck on the lid or sides of the jar. The small nuggets (2-4) formed by the initial 100 mL of suspended fibers were removed with tweezers and added to a jar containing a fresh 100 mL suspension of 0.1 g/L Mitsubishi fibers. Again 500 µL of 2.5 wt % PEI in chloroform was added to the solution and shaken vigorously. The small nuggets aggregated to form a larger nugget. The larger nugget was grown again by moving it to jar containing a fresh 100 mL suspension of 0.1 g/L Mitsubishi fibers and the process repeated until a large nugget was removed from solution by tweezers and left to dry in air. The entire process from the formation of the small "seed" nuggets followed by the growth to large nuggets was repeated to form many large nuggets. The larger nuggets were aligned manually into a sheet. Each nugget to be attached to the other nuggets was dipped briefly in chloroform. The solubilized PEI on the outside of the nuggets acted as a glue to bind the two nuggets together. Once the sheet of nuggets was of the desired size it was pressed in a hot press.

A method for self-assembly of high aspect ratio fibers or particles in solution is described here. Fibers in suspension are self-assembled along their longest length through agitation and the addition of an immiscible second phase. The self-assembled aggregate can be grown by the addition of more fibers, and/or fiber suspension, and second immiscible phase. Polymers and other materials can be added to the second immiscible phase to form a composite material. The self-assembled aggregate can be closely packed and the distance between the fibers can be modulated by the quantities of the polymers and other materials added to the second phase. The resultant self-assembled aggregate can remain in or be removed from the solution. One example of an application of this invention is the creation of a carbon fiber and polymer composite. Here carbon fibers have been suspended in water and upon agitation and the addition of chloroform containing dissolved polymer form a self-assembled aggregate. These self-assembled aggregates were grown to a size at which they were easily manipulated. These aggregates have been successfully aligned and then pressed to form a macroscale sheet.

The ability to self-assemble materials with the smallest length scales in micro- or nanometers which are not easily manipulated by conventional techniques into aggregates that can either be used directly after the self-assembly or further manipulated by existing processed greatly expands the scope of materials and processes that become possible. The alignment of high aspect ratio fibers or particles, to the best of our knowledge, has been performed by first attaching specific entities onto the fiber or molecule in order to aggregate the fibers or particles or by relying on surface charges on the fibers themselves. This method does not require pre-attachment of a binding material to the fibers and allows for the formation of a composite, which cannot be accomplished through the aggregation based on surface charges.

The alignment during agitation is aided by interfacial forces, particle-particle interaction and particle-droplet interaction. If droplets are too large, the particles may not be brought close enough to be subject to particle-particle interactions.

The particle concentration in the mixture is a function of length of long axis of the particles and potential entanglement. The shorter the length of the long axis of the particles, the higher the concentration of the particles can be.

The length of particles in the mixture is near or below the percolation threshold of the mixture to avoid substantial overlap of the particles before alignment.

As agitation proceeds, the particles align in 3 dimensions along the long axis to form aggregates. The droplets coalesce as the mixture agitates thereby bringing the particles in proximity to one another. The rate that particles aggregate is a function of the vol % of the dispersed phase and the vol % of the particles.

Carbon fiber/polymer composites are high-performance lightweight materials in which aligned carbon fibers are incorporated into a polymer matrix (thermoset or thermoplastic) to enhance mechanical, thermal, and electrical properties for use in the aerospace, automotive and sports equipment industries[1]. Traditional manufacturing of these composites is expensive due to the costly production of long continuous carbon fibers and laborious processing steps. Furthermore, continuous aligned fiber composites are restricted to non-complex geometries. Traditional composite manufacturing leaves behind 20-30 percent short fiber material. An inexpensive high-throughput method of aligning and consolidating short fiber is lacking. Short-fiber composites with overlapping fibers offer several advantages; suited for making complex geometries[2], utilize less expensive short fibers (typically waste)[3], better processability[4], and recyclability[4]. We present a simple one step method to process waste short fiber into composite precursors (denoted as needles); significantly increasing processability. We demonstrate the control of needle microstructure and consolidation of needles into larger scale composite forms with simple processing techniques.

The success of short-fiber composites hinders on achieving material properties similar to that of continuous aligned fiber composites. The most important parameters that affect material properties of composites are the degree of fiber alignment and the fiber volume fraction[5-7]. Methods to align short carbon fibers (aspect ratios from 200 to 1200) include water transfer of fibers onto a moving conveyor[8] followed by water removal by vacuum and, more recently, 3D-printing composites[9,10]. Water transfer, however, has so far resulted in low fiber alignment, and the 3D-printed composites are limited to low fiber volume fractions due to the unaligned feedstock. Integration of fiber alignment with thermoplastic impregnation, which eliminates a processing step, has not yet been achievable. Here, we describe the self-assembled composite method (SAC method) of self-assembling fibers into a composite building block with controlled dimensions for use in advanced manufacturing techniques. We validated the method by forming building blocks of highly aligned short carbon fibers with a controlled volume fraction of resin. The SAC method readily achieves volume fractions that compare to high-performance composites from traditional manufacturing methods[11]. Furthermore, the method should allow for the development of building blocks from a wide range of materials, not limited to carbon fiber.

Self-assembly of mesoscale materials (10 μm to 10 mm) using capillary forces is a successful strategy to assemble small objects into ordered aggregates[12-17]. Mesoscale materials are not easily assembled with traditional manufacturing methods, creating an opportunity for the development of commercial self-assembly methods[12]. Self-assembly by capillary forces occurs due to the minimization of free energy of the system consisting of two immiscible fluids and the contacting surfaces[13]. 2D self-assembly using capillary forces has been used in conjunction with patterning to align and weld parts[14-17] and assemble particles at surfaces[12]. In addition, 3D capillary self-assembly of mesoscale particles has yielded some impressive structures[12,18-20]. Unlike isotropic particles, researchers have shown that rods, fibers, and tubes, do not require patterning in order to form aggregates aligned along the long axis[20,21]. There are, however, certain restrictions that prevent the generalization of previously reported self-assembly methods to a wide-range of materials and applications. For example, one self-assembly method requires the substrate surface first be engineered to retain a liquid phase or adhesive film[12,19,22] for use in the self-assembly step.

The present single-step self-assembly method, denoted the SAC method, utilizes two immiscible fluids and the anisotropy of the fibers to form unidirectional overlapping fiber aggregates, or "needles" (FIG. 10A-10C). Thousands of fibers are self-assembled in solution via vigorously shaking a suspension of chopped carbon fibers in water, fluid A, with a small amount (1 vol %) of chloroform, fluid B (FIG. 10B). Unlike previous capillary self-assembly processes[12,19,22], the immiscible fluid B is added to the bulk solution rather than directly to the fibers. The shaking of 20 mL vials produces droplets of fluid B with a median diameter of 3.2 μm (see supplementary). The suspended fibers are brought together along their long axis in the presence of droplets to form small aggregates that grow with continued shaking. The same phenomenon is also observed using a stir bar at high rate instead of shaking. The process of aligning approximately 1500-10000 fibers is completed in less than 30 seconds. This is quite surprising as other capillary self-assembly methods require many hours[20,22]. The alignment of the fibers was confirmed by scanning electron microscopy, SEM, of the assembled needle's long axis and cross-section (short axis); see FIG. 10C.

There are several processing parameters that control the outcome of the SAC method: fiber vol %, fiber aspect ratio, fluid B vol %, method of agitation, and choice of fluid A and B. One important parameter in achieving a single self-assembled needle (FIG. 10B, left image) seems to be the mass ratio of fluid B to fibers—too low of a mass ratio leads to suspended fibers with droplets on them; an intermediate mass ratio results in a suspension of mini-needles; and too high of a mass ratio leads to unaligned aggregates. We acknowledge that the chaotic mixing employed in this study results in variation in the number of needles formed from batch to batch.

Figure 11A:
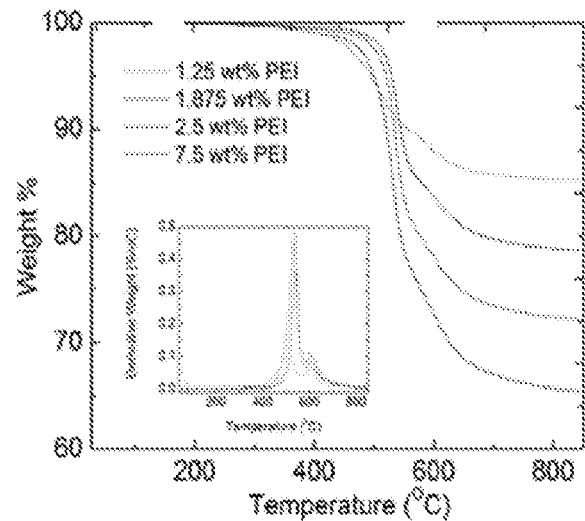
FIGS. 11A-11C show properties of aligned short carbon fiber and thermoplastic PEI composites made via the SAC method.
Figure 11B:
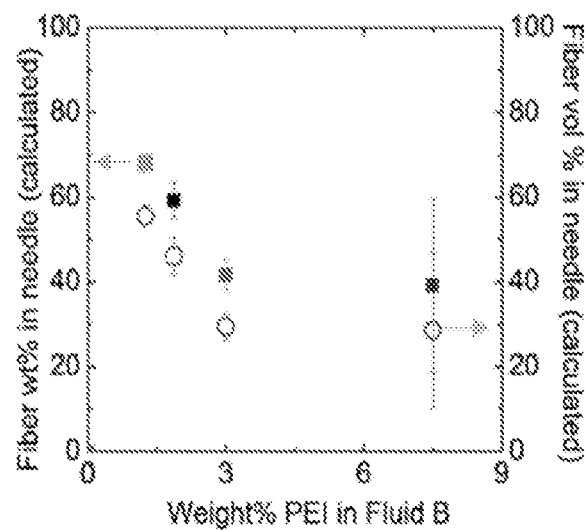
Figure 11C:
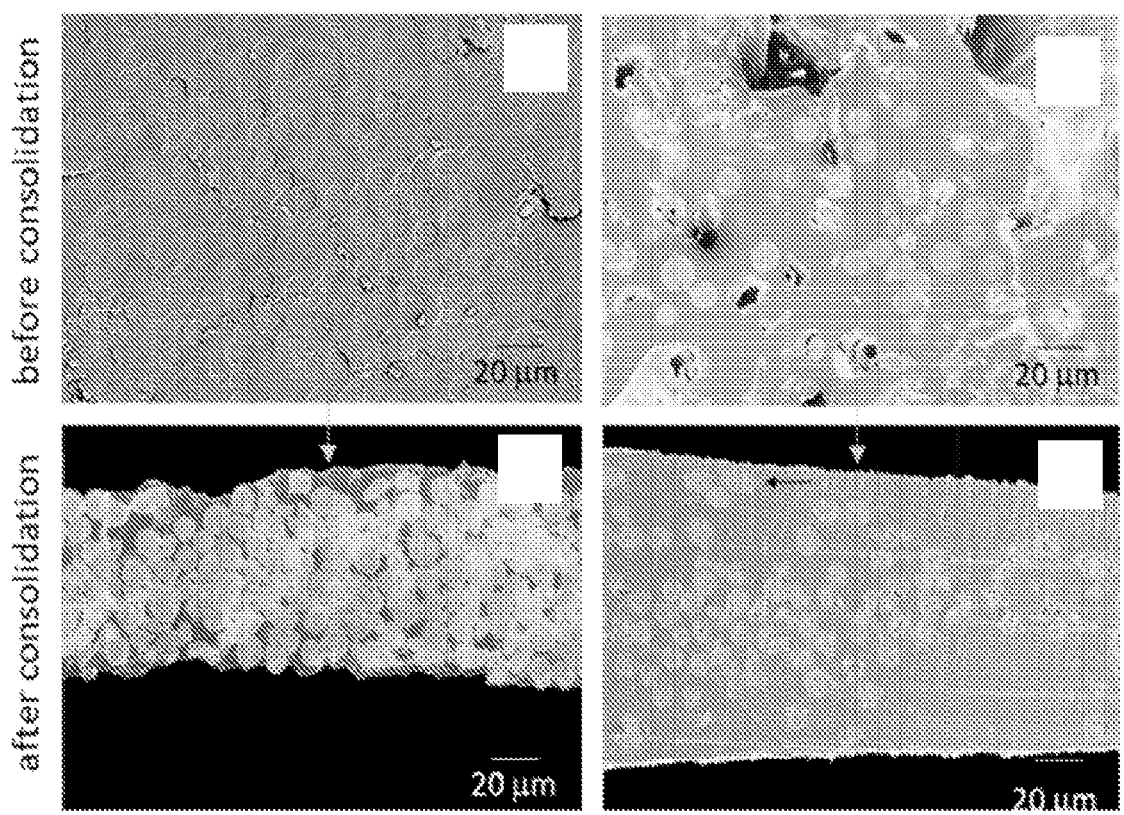

Short-fiber thermoplastic composites can be easily formed with the SAC method by dissolving a polymer into fluid B. The volume fraction of thermoplastic polymer in the composite can be controlled by varying the concentration of polymer in fluid B. FIGS. 11C-11D show cross sectional SEM images of two volume fractions achieved. The mass of polymer in FIG. 11A-11B was determined to be 68 and 39 wt %, respectively, via thermogravimetric analysis (TGA).

The corresponding fiber vol % is calculated to be 56 and 29 fiber vol %, respectively. Note that 56 vol % is close to the 60 vol % required in high-performance composites[11] (see supplementary information). Incorporation of polymer during fiber alignment eliminates the processing step of polymer impregnation currently required in composites manufacturing.

56 vol % requires significant fiber alignment, which is evident in FIGS. 11C and 11E. At 29 wt % polymer (FIGS. 11D and 11F), a high polymer loading for the SAC method, some fiber misalignment is apparent, noted by the arrow pointing to the oval-shaped fiber cross-sections in FIG. 11F. Using the SAC method, forming high-volume fractions of aligned carbon fibers is just as easy, if not easier, than forming lower volume fraction composites, which can have misaligned fibers and excess polymer. This is in direct contrast with current composite production methods in which it is more difficult or more expensive to make products with a higher volume fraction of fibers.

Consolidation of the needles (i.e., pressing them above the melting temperature of the polymer) successfully removes the voids present in cross-sectioned needles in FIGS. 11C and 11D (FIGS. 11E and 11F). The voids may be formed during alignment or drying. However, since these short-fiber composites needles must go through a consolidation step before they form a final product, the presence of the voids is not a concern. Within the consolidated needles, the spacing between the carbon fibers is less than that of the original needle (FIGS. 11C and 11F), which is an artifact from consolidation of the needle using a hot press without a mold.

Figure 12A:
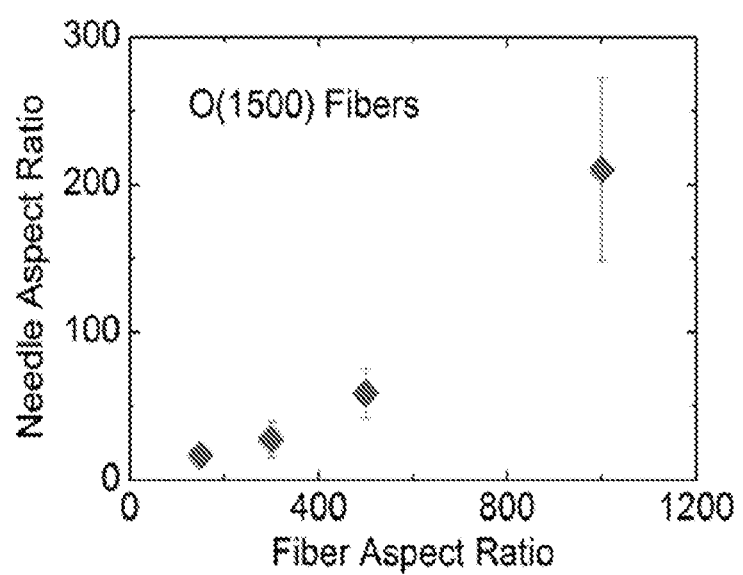
FIG. 12A shows resulting needle aspect ratio as a function of fiber aspect ratio.

Needles formed by the SAC method, especially when sequential self-assembly steps are performed, can be easily manipulated without noticeable fiber breakage. Lower aspect ratio (length/diameter) needles (~20) are fairly inflexible while longer aspect ratio needles (>60) are more flexible. The aspect ratio of needles is primarily dependent on the aspect ratio of the base fiber (FIG. 12A). The highest aspect ratio fiber tested corresponds to a carbon fiber of 5 mm in length and 5 μm in diameter. It is unknown if higher aspect ratio fibers are suitable for assembly with the SAC method. FIG. 3a also demonstrates the repeatability of the SAC method as each data point corresponds to ten replicates.

Figure 12B:
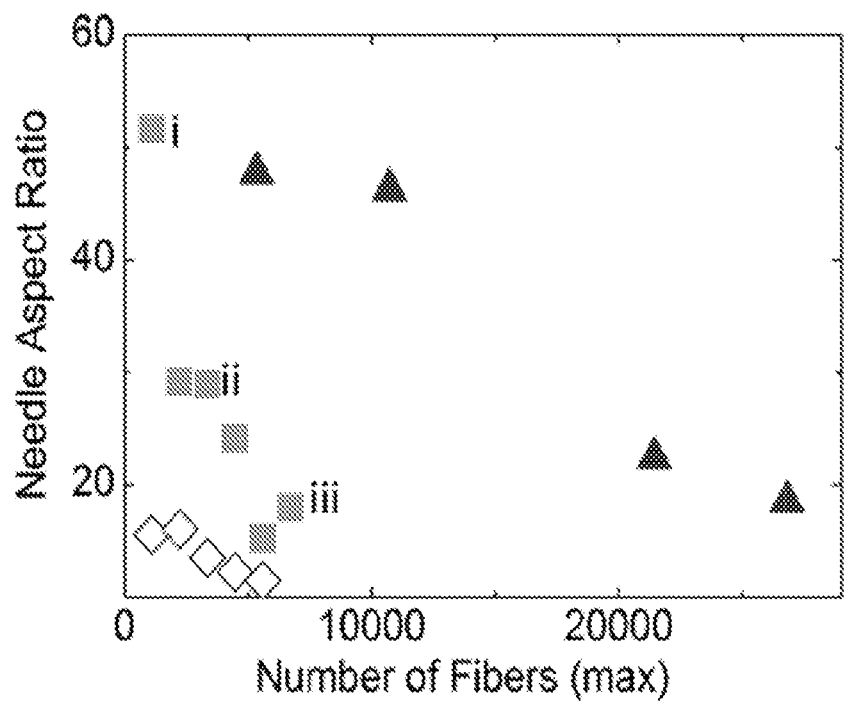
FIG. 12B shows snapshots of a needle after the $1^{st}$ (i), $3^{rd}$ (ii), and $6^{th}$ (iii) SAC iterations.
Figure 12C:
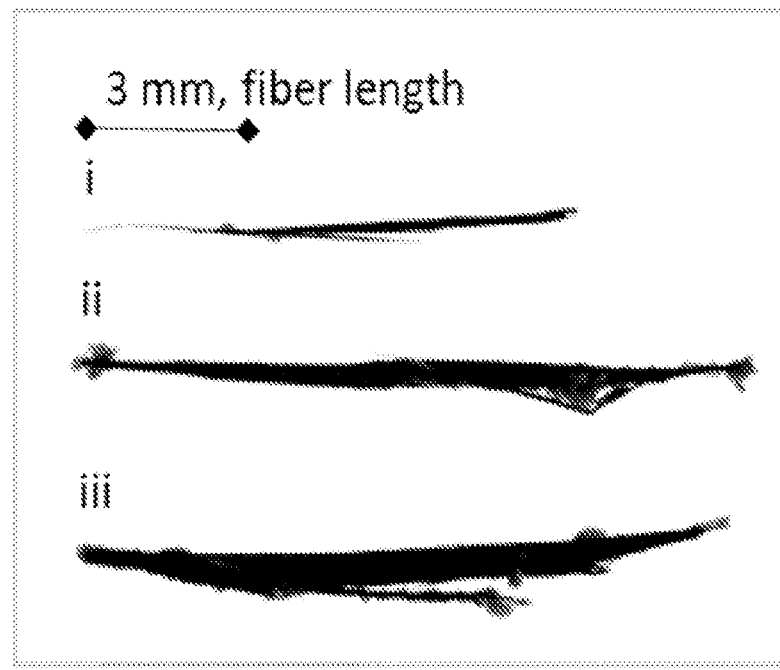
FIG. 12C shows needle aspect ratio decreasing as a function of number of fibers (i.e. number of SAC iterations) and different process conditions (symbols). (■ and ◇ have different polymer loadings and ▲ is made from a higher aspect ratio fiber than ■). The results for (i), (ii), and (iii) are noted next to the corresponding data.

The ease of handling the needles can be further increased by increasing the number of fibers incorporated into the needle. This both lowers the aspect ratio of the needle and increases the overall size. For example, a seed needle, formed by the first self-assembly step, is added to a suspension of single fibers prior to the addition of fluid B and agitation. FIG. 12B shows snapshots of the same needle after the (i) first, (ii) third, and (iii) sixth iterations of fiber addition. The aspect ratios of the needle corresponding to i,ii, and iii (shown in FIG. 12C) decrease with increasing fibers. Two different sets of processing variables and two different fibers are represented in FIG. 12C. The number of self-assembly steps as well as the aspect ratio of the fibers can be used to control the resulting needle aspect ratio.

SAC needles with controlled fiber volume fraction and size can form a variety of materials. Two examples are a unidirectional composite sheet (FIG. 9, image (c)) and a composite strand (FIG. 9, image (d)). Short carbon fibers (FIG. 9, image (a)) were self-assembled into needles (FIG. 9, image (b)) that could then be manually manipulated into a composite sheet followed by consolidation (FIG. 9, image (c)). Higher aspect ratio fibers can be formed into a composite strand (FIG. 9, image (d)). The current product closest to our aligned self-assembled composites are chopped tape prepregs (unidirectional prepreg tape made from long carbon fibers). The prepreg tapes are currently consolidated into parts by compression molding[23]. It is anticipated that needles can be processed using similar machinery. Although the SAC method of forming aligned short-fiber composites is a batch process, we already anticipate the SAC method can be converted to a continous process for commercial production.

In addition to carbon-fiber/polymer composites, the SAC method may be employed for self-assembly of other anisotropic mesoscale particles and fluid systems. As a proof of principle, we used oil as fluid B and inverted the fluids described in this letter together with a water soluble polymer to form highly aligned self-assembled needles (supplementary information).

The SAC method is a facile method of aligning short carbon fibers with fiber overlap, high fiber volume fraction, and high fiber alignment. In addition, the SAC method eliminates the processing step of polymer impregnation by combining alignment and polymer integration into one step. Together, this suggests that self-assembly of short-fiber composites may be an economical alternative to continuous fiber composites; especially when considering the use of waste chopped fiber. This technique has the potential to revolutionize the use of waste chopped fiber for building small parts from highly aligned, high volume fraction carbon fiber macroscopic needles. Comparison of mechanical properties of short carbon fiber composites formed via SAC with traditional methods is the subject of a future detailed investigation.

Supplemental Information

Materials

Chopped carbon fibers with aspect ratios from 150-1000 from both pitch-based and polyacrylonitrile-based (PAN-based) sources were used. Pitch-based carbon fibers with a diameter of 10 μm and length of 3 mm were obtained from Mitsubishi and sized with a polymer coating (Dialead Pitch Carbon Fiber Type K63B12, Lot #05196-1, density of 2.17 g/cm$^3$). PAN-based carbon fibers with a diameter of 5 μm and length of 3 mm and 5 mm were received from Hexcel; Stamford, CT, density of 1.78 g/cm$^3$. In addition, pitch-based carbon fibers and 5 mm PAN-based carbon fibers were cut in half with a razor blade to create additional aspect ratio fibers with lengths 1.5 mm and 2.5 mm. Water used in the experiments was MilliQ water (resistivity of 18.2 MOhms·cm) or MilliQ water saturated with chloroform ($CHCl_3$)(BDH VWR Stabilized ACS). MilliQ water saturated with chloroform was prepared by extracting the supernatant of MilliQ water mixed with excess chloroform. Polyether imide (PEI), Ultem 1000F3SP-1000 lot #UL4YMB density of 1.27 g/cm$^3$, SABIC; Riayda Saudia Arabia, was dissolved in chloroform at 1.25-7.5 wt %. Poly(acrylic acid) (PAA) was sourced from Aldrich Lot SLBS6469 and Safflower oil was sourced from Natural Value (Sacramento, CA). Acetone and toluene were received from Sigma-Aldrich (St. Louis, MO) and methanol was received from VWR (Radnor, PA).

Sizing Removal of Pitch-Based Fibers

Sizing was removed from the pitch-based fibers with two methods: burning and solvent washing. The sizing was burned by placing the fibers in a Barnstead Thermodyne 48000 furnace at 650° C. for 1.5 hours. This treatment both removed the sizing but also degraded the carbon fiber. Solvent washing was performed by sonicating the fibers in a bath sonicator for 10 min at a 1:1 volume ratio in a series of solvents. There are 8 sonication steps between which the fibers are drained. The solvents in order are: MilliQ water, MilliQ water, Methanol, Methanol, Acetone, Acetone, Toluene, Toluene. Following the last sonication step, the fibers were thoroughly rinsed in acetone and dried at 60° C. for several hours.

SAC Method Details

Carbon fibers were dispersed in MilliQ water or MilliQ water saturated with chloroform by shaking, rotational mixing, and/or physical manipulation. Before each experiment the fibers were redispersed by shaking as their density is greater than water. The chloroform was either added to the water phase by bolus syringe drop and shaken or added by fast injection with a syringe followed immediately by shaking. Vigorous shaking of scintillation vials (20 mL) or 100 mL media bottles for ≤1 min was performed by hand as a way to agitate the system. Teflon tape was placed over the mouth of the bottles between the cap and the solution to prevent components from the cap, especially for the scintillation vials, from being solubilized by the chloroform. The needles were removed from solution with tweezers and dried in air. The specific conditions used for the experiments presented in FIGS. 9-12 are listed in Table 2.

TABLE 2

SAC method conditions used for data presented in FIGS. 9-12 and experiments discussed in the text.

| FIG. | Fluid A | Fluid B | Carbon Fiber | vol % fibers in A | vol % B in A | wt % PEI in B | Total volume and container | Agitation |
|---|---|---|---|---|---|---|---|---|
| 10 | water saturated with $CHCl_3$ | $CHCl_3$ | PAN-based, 3 mm | $1.6 \times 10^{-3}$ | 1.0 | — | 21 mL in 20 mL scintillation vial | shaking |
| 11 | water saturated with $CHCl_3$ | $CHCl_3$ with PEI | Pitch-based (solvent) | $1.1 \times 10^{-3}$ | 0.1 | 1.25, 1.87, 3, 7.5 | 21 mL in 20 mL scintillation vial | shaking |
| 12A | Water | $CHCl_3$ with PEI | PAN-based 5 mm and Pitch-based (burned) | 0(1500) fibers | 1.0 | 2.5 | 20 mL in 20 mL scintillation vial | shaking |
| 12C triangle | water saturated with $CHCl_3$ | $CHCl_3$ with PEI | PAN-based 3 mm | $1.1 \times 10^{-3}$ | 0.1 | 1.25 | 21 mL in 20 mL scintillation vial | shaking |
| 12C | water | $CHCl_3$ | Pitch-based | $1.1 \times 10^{-3}$ | 0.1 | 1.25 | 21 mL in 20 mL |

TABLE 2-continued

SAC method conditions used for data presented in FIGS. 9-12 and experiments discussed in the text.

| FIG. | Fluid A | Fluid B | Carbon Fiber | vol % fibers in A | vol % Bin A | wt % PEI in B | Total volume and container | Agitation |
|---|---|---|---|---|---|---|---|---|
| squares | saturated with CHCl$_3$ | with PEI | (solvent) | | | | scintillation vial | |
| 12C diamonds | water saturated with CHCl$_3$ | CHCl$_3$ with PEI | Pitch-based (solvent) | $1.1 \times 10^{-3}$ | 0.1 | 5 | 21 mL in 20 mL scintillation vial | shaking |
| 9 | water saturated with CHCl$_3$ | CHCl$_3$ with PEI | Pitch-based (burned) | $4.4 \times 10^{-3}$ | 0.5 | 2.5 | 110 mL in 100 mL media bottle | shaking |
| 9 | water saturated with CHCl$_3$ | CHCl$_3$ with PEI | PAN-based 5 mm | $1.6 \times 10^{-3}$ | 0.1 | 0.7, 1, 2.5 | 110 mL in 100 mL media bottle and 21 mL in 20 mL scintillation vial | shaking |
| Inverted | CHCl$_3$ | water with PAA | PAN-based 3 mm | $1.6 \times 10^{-3}$ | 0.2 | 20-50 | 21 mL in 20 mL scintillation vial | shaking |
| Alt. B | Water | Safflower oil | PAN-based Pitch-based (burned) | $1.1 \times 10^{-3}$ $4.4 \times 10^{-3}$ | 0.3 | — | 21 mL in 20 mL scintillation vial | shaking |

Aligned short-fiber composites with PAA and PAN-based 3 mm carbon fibers were made with the SAC method with conditions shown as "Inverted" in Table 1. Upon shaking, 2-3 needles formed with precipitate in the chloroform solution. When the needles were removed from solution and dried, they could be used as seed needles to add fibers to the needle. Agitation by stirring was performed with a stir bar. We determined that an air interface is not necessary for the self-assembly of a needle by agitating the system with a stir bar and stirring without the air interface.

Optical Microscopy

Optical microscopy was performed with a stereoscope (AMScope Stereo Zoom Microscope, SM-3BZ-80S) with a digital camera (Amscope MU130), light stage (Dolan Jenner QVMABLM), and haloid light source (Amscope Series Haloid Lamp Cold-Light Source). In addition, an optical zoom lens was used in place of the stereoscope for large samples. Needles were imaged in two orientations to account for asymmetry in the diameter of the needle. Measurement of the needle's length was taken from tip to tip. The diameter of the needle was calculated by averaging of the mid-range diameter of the needle measured in both orientations, thereby neglecting the taper of the needle.

Measurement of Droplet Size

The droplet size of chloroform was assessed visually after vigorously shaking 200 µl of chloroform in 21 mL of water already saturated with chloroform in a 20 mL scintillation vial. Digital images of the droplets were taken using a stereoscope and camera about 20 seconds after agitation, and they appeared to be stable in size during this time without significant coalescence.

Composite Part Production

The needles were manually aligned into a sheet and strand without a mold. Each needle was dipped briefly in chloroform and attached to another needle. The solubilized PEI on the outside of the needles acted as a glue to bind the needles together.

Consolidation of Needles

A heated laboratory press (Carver Laboratory Heated Press model #3925, Carver Inc. Wabash, IN) was used to consolidate the composites and remove voids. The needles and composite sheet were placed between two flat aluminum sheets (without a mold) within the press at 240° C. for 30 min and 2,000 lbs. and 20,000 lbs., respectively. The items were removed from the press and allowed to cool before separating from the aluminum sheets.

Sample Preparation for SEM Imaging

Needles made with only chloroform could not be handled without the fibers separating from one another once they were dry (for optical imaging they were dried on the light stage). Serendipitously, a slight bit of adhesive from double-sided tape was solubilized by the chloroform when making some needles. This small bit of adhesive bound the fibers together after the needle dried, enabling the visualization with SEM (FIG. 10C). Cross-sections of fibers were mounted on the outside of metal nuts.

Consolidated samples were cross-sectioned across the short axis with a razor blade and then embedded in epoxy (5-minute Dev-tube, #230-14250, Devcon Hartford, CT) within a silicone mold. The epoxy was mixed with a planetary mixer (Thinky ARE-310, Laguna Hills, CA) for 30 sec at 2000 rpm and 30 sec at 2200 rpm. The epoxy was poured into the mold, and the composite sample was placed in the epoxy with tweezers and stabilized until the epoxy hardened. The epoxy was cured at room temperature overnight.

Polishing of embedded samples was performed on a Spectrum System 1000 polisher. Polishing was performed in a step-down fashion, moving from coarser to finer grits: 120 grit silicon carbide, 1200 grit silicon carbide, and followed by 3 µm, 1.0 µm, 0.5 µm, and 0.1 µm grain-size diamond lapping sheets. Surfaces were cleaned in an ultrasound bath within MilliQ water for 1 minute and rinsed with isopropanol. Polishing of unconsolidated needles was performed with only the 0.5 µm and 0.1 µm grain-size diamond lapping sheets.

Scanning Electron Microscopy (SEM)

A Zeiss Supra50VP was used to image carbon fibers and polymer in the needles produced from the SAC method. Prior to imaging the samples, they were sputter coated (Cressington Scientific, 208HR) with approximately 8-10 nm of 80/20 Platinum/Palladium (40 sec, 40 mA). An accelerating voltage of 5 kV was used in all images. Both the SE detector and the inLens detector were used. Images were taken at 250×, 500×, and 1 k×.

Thermal Gravimetric Analysis (TGA)

Four or more needles were included per run of the TGA (TAQ50, Thermal Analytics, Calumet, MI). Needles were chopped finely with a razor blade, placed on a platinum pan, and heated to 200° C. for 5-30 minutes to dry the needles. This was followed by a heating ramp at 10° C./min from ~40-850° C. under an Argon environment (60 mL/min balance purge, 40 mL/min sample purge) (FIG. 11A). Analysis of the TGA data was performed with the use of Universal Analysis software with plateaus at 200° C. and 850° C. PEI leaves behind char residue when thermally degraded under argon. The char residue of the PEI used in this study was run under the same TGA conditions of 47.70 weight %. The weight change % of the samples at 544° C. were divided by the char residue to obtain the mass of PEI in the samples, $m_p$. The remaining mass was assumed to be that of the carbon fibers, $m_f$. A smoothing operation was used on the mass loss derivative. The volume % of fiber in the sample was then calculated by the following equation:

$$\text{fiber } vol \% = \frac{\left(\frac{m_f}{\rho_f}\right)}{\left[\left(\frac{m_f}{\rho_f}\right)+\left(\frac{m_p}{\rho_p}\right)\right]} \times 100$$

where $\rho_f$ and $\rho_p$ are the densities of the carbon fiber and polymer PEI, respectively.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about." whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law. Other suitable modifications and adaptations of the variety of conditions and parameters normally encountered in the field, and which are obvious to those skilled in the art, are within the scope of the disclosure.

All patents and publications cited herein are fully incorporated by reference herein in their entirety or at least for the portion of their description for which they are specifically cited or relied upon in the present description.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component (s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

REFERENCES

The following references may be useful in understanding some of the principles discussed herein:

1. Chand, S. Carbon fibers for composites. J. Mater. Sci. 35, 1303-1313 (2000).
2. Shokrieh, M. M. & Moshrefzadeh-sani, H. An optimized representative volume element to predict the stiffness of aligned short fiber composites. (2016). doi:10.1177/0021998315618456
3. Fu, S. & Lauke, B. EFFECTS OF FIBER LENGTH AND FIBER ORIENTATION. 56, 1179-1190 (1996).
4. Such, M., Ward, C. & Potter, K. Aligned Discontinuous Fibre Composites: A Short History Aligned Discontinuous Fibre Composites: A Short History. (2014). doi:10.12783/issn.2168-4286/2/3/4
5. Dhakate, S. R., Mathur, R. B. & Dhami, T. L. Mechanical Properties of Unidirectional Carbon-carbon Composites as a Function of Fiber Volume Content. 3, 127-132 (2002).
6. Liu, B., Xu, A. & Bao, L. Preparation of carbon thermoplastics with high fiber volume fraction and high properties. 2, 3-15 (2017).
7. Pan, N. Theoretical Determination of the Optimal Fiber Volume Fraction and Fiber-Matrix Property Compatibility of Short Fiber Composites*. 14, (1993).
8. Yu, H., Potter, K. D. & Wisnom, M. R. Composites: Part A A novel manufacturing method for aligned discontinuous fibre composites (High Performance-Discontinuous Fibre method). 65, 175-185 (2014).
9. Lewicki, J. P. et al. 3D-Printing of Meso-structurally Ordered Carbon Fiber/Polymer Composites with Unprecedented Orthotropic Physical Properties. Nat. Publ. Gr. 1-14 (2017). doi:10.1038/srep43401
10. Tekinalp, H. L. et al. Highly oriented carbon fiber-polymer composites via additive manufacturing. Compos. Sci. Technol. 105, 144-150 (2014).
11. Chung, D. D. L. Processing-structure-property relationships of continuous carbon fiber polymer-matrix composites. Mater. Sci. Eng. R 113, 1-29 (2017).
12. Bowden, N., Tien, J., Huck, W. T. S. & Whitesides, G. M. Mesoscale self-assembly: the assembly of micron- and millimeter-sized objects using capillary forces. in Supramolecular Organization and Materials Design (eds. Jones, W. & Rao, C. N. R.) 103-145 (Cambridge University Press, 2001). doi:10.1017/CBO9780511564987.005
13. Mastrangeli, M., Zhou, Q., Sariola, V. & Lambert, P. Surface tension-driven self-alignment. Soft Matter 13, 304-327 (2017).
14. Xiong, X. et al. Controlled Multibatch Self-Assembly of Microdevices. 12, 117-127 (2003).
15. Srinivasan, U., Liepmann, D. & Howe, R. T. Microstructure to Substrate Self-Assembly Using Capillary Forces. 10, 17-24 (2001).
16. Knuesel, R. J., Park, S., Zheng, W. & Jacobs, H. O. Self-assembly and self-tiling: Integrating active dies across length scales on flexible substrates. J. Microelectromechanical Syst. 21, 85-99 (2012).
17. Liimatainen, V., Kharboutly, M., Rostoucher, D., Gauthier, M. & Zhou, Q. Capillary self-alignment assisted hybrid robotic handling for ultra-thin die stacking. Proc.—IEEE Int. Conf. Robot. Autom. 1403-1408 (2013). doi:10.1109/ICRA.2013.6630754
18. Huck, W. T. S., Tien, J. & Whitesides, G. M. Three-dimensional mesoscale self-assembly [12]. J. Am. Chem. Soc. 120, 8267-8268 (1998).
19. Terfort, A., Bowden, N. & Whitesides, G. M. Three-dimensional self-assembly of millimetre-scale components. Nature 386, 162-164 (1997).
20. Gu, Z., Chen, Y. & Gracias, D. H. Surface tension driven self-assembly of bundles and networks of 200 nm diameter rods using a polymerizable adhesive. Langmuir 20, 11308-11311 (2004).
21. Gu, Z., Ye, H. & Gracias, D. H. The Bonding of Nanowire Assemblies Using Adhesive and Solder. JOM 57, 60-64 (2005).
22. Bowden, N., Terfort, A., Carbeck, J. D. & Whitesides, G. M. Self-assembly of mesoscale objects. 23 (2003).
23. Howell, D. D. & Fukumoto, S. COMPRESSION MOLDING OF LONG CHOPPED FIBER THERMOPLASTIC COMPOSITES.
24. Gu, Z., Chen, Y., & Gracias, D. H. (2004). Surface Tension Driven Self-Assembly of Bundles and Networks of 200 nm Diameter Rods Using a Polymerizable Adhesive, (6), 11308-11311. haps://doi.org/10.1021/1a047937o
25. Kalashnikova, I., Bizot, H., Bertoncini, P., & Capron, I. (2013). Soft Matter Cellulosic nanorods of various aspect ratios for oil in water Pickering emulsions †, 952-959. https://doi.org/10.1039/c2sm26472b
26. Knuesel, R. J., Park, S., Zheng, W., & Jacobs, H. 0. (2012). Self-assembly and self-tiling: Integrating active dies across length scales on flexible substrates. Journal of Microelectromechanical Systems, 21(1), 85-99. haps://doi.org/10.1109/JMEMS.2011.2174424
27. Levine, I. N. (2001). Physical Chemistry (5th ed., p. 955). Boston: McGraw-Hill.
28. Mastrangeli, M., Abbasi, S., Varel, C., Van Hoof, C., Celis, J. P., & Böhringer, K. F. (2009). Self-assembly from milli- to nanoscales: Methods and applications. Journal of Micromechanics and Microengineering, 19(8). haps://doi.org/10.1088/0960-1317/19/8/083001
29. Mastrangeli, M., Zhou. Q., Sariola, V., & Lambert, P. (2017). Surface tension-driven self-alignment. Soft Matter, 13(2), 304-327. https://doi.org/10.1039/C6SM02078J
30. Whitesides, G. M., & Grzybowski, B. (2002). Self-assembly at all scales. Science, 295(5564), 2418-2421. https://doi.org/10.1126/science.1070821

What is claimed is:

1. A method for assembling particles having a long axis, a short axis and an average aspect ratio of 10-10,000, whereby said method comprises steps of:
    agitating a combination of a first solution, a second solution and the particles in any order to form a mixture wherein one of the first solution and the second solution is in the form of droplets dispersed in the other of the first solution and the second solution and the long axis of the particles is longer than a diameter of the droplets in the mixture, and
    continuing the agitation until the particles assemble into aggregates of particles with at least 30% of the particles aligned in parallel along the long axis.
2. The method of claim 1, wherein the agitation is stochastic.
3. The method of claim 1, wherein the agitation is effected by ultrasound, shaking or stirring, or the agitation is effected by mechanical shaking.
4. The method of claim 1, wherein the droplet is smaller in diameter than half the length of the long axis of the particle.
5. The method of claim 1, wherein the droplet is smaller in diameter than half the length of the short axis of the particle.
6. The method of claim 1, wherein one of the first solution or the second solution comprises 0.001 to 5 vol. % of the mixture.

7. The method of claim 1, wherein the first solution is insoluble or immiscible in the second solution.

8. The method of claim 1, wherein one of the first and the second solutions is hydrophobic and another of the first and the second solutions is hydrophilic.

9. The method of claim 1, wherein both the droplets and a surface of the particles are hydrophilic.

10. The method of claim 1, wherein both the droplets and a surface of the particles are hydrophobic.

11. The method of claim 1, wherein the second solution comprises a mixture of soluble species comprising polymer resins.

12. The method of claim 1, wherein the second solution comprises chloroform and the first solution comprises water.

13. The method of claim 1, wherein the second solution comprises safflower oil and the first solution comprises water.

14. The method of claim 1, wherein the particles are selected from the group consisting of fibers, polymers, proteins, mixed metal oxides and combinations thereof.

15. The method of claim 1, wherein the particles have been silanized, oxidized, modified with chemicals bonded to the surface, or combinations thereof.

16. The method of claim 1, wherein either the first or second solution contains a polyetherimide, polystyrene, polyamide, polyimide, polyolefin, polysulfone, polyvinyl, polyacrylate, polyacrylonitrile, cellulosic, polyfluoride (fluoroplastic), polycarbonate, polyester, polyphenylene oxide, polyketone, epoxy, furan, alkyl, phenolic, polyurethane, silicone, amino plastic, alkyd, allylic, or combinations thereof.

17. An aggregate or aggregate composite formed in the method according to claim 1, wherein at least 30% of the particles are aligned in parallel along the long axis and the aggregate comprises 1 to 95 vol. % particles and 99 to 5 vol. % polymer resin.

18. A method for forming a composite sheet comprising the steps of the method according to claim 1 and further comprising a step of: heating the aggregates at temperature greater than the softening temperature of a polymer resin in the mixture and under a pressure sufficient to compress the aggregates into a sheet.

19. A method for assembling particles having a long axis, a short axis and an average aspect ratio of 10-10,000, said method comprising steps of:

combining a first solution, a second solution and the particles in any order to form a layered mixture having multiple phases wherein at least 90 vol. % of one of the first solution and the second solution is in a separate phase in the mixture and is positioned in a top layer above at least 90 vol. % of the other solution which is positioned in layer below said top layer, and aligning the particles at the interface between the phases into aggregates of the particles with at least 30% of the particles aligned in parallel along the long axis.

20. The method of claim 19, wherein the first solution comprises water and the second solution comprises at least one component selected from the group consisting of chloroform and safflower oil.

* * * * *